United States Patent Office 3,513,822
Patented May 26, 1970

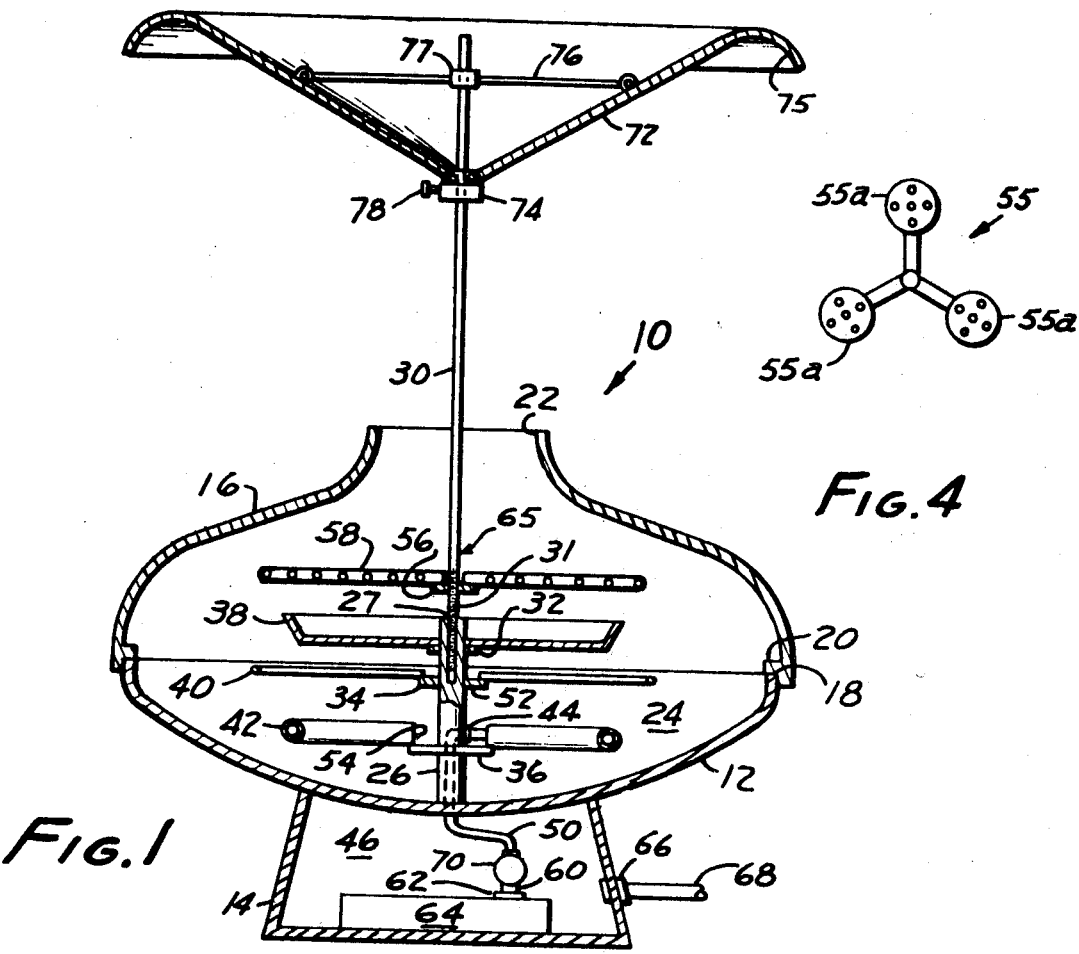
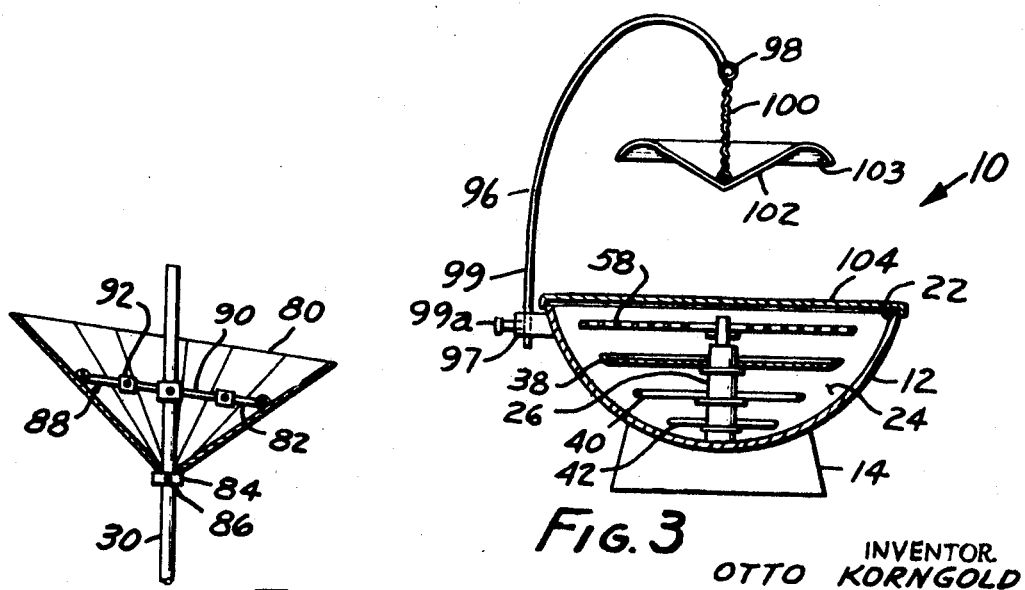

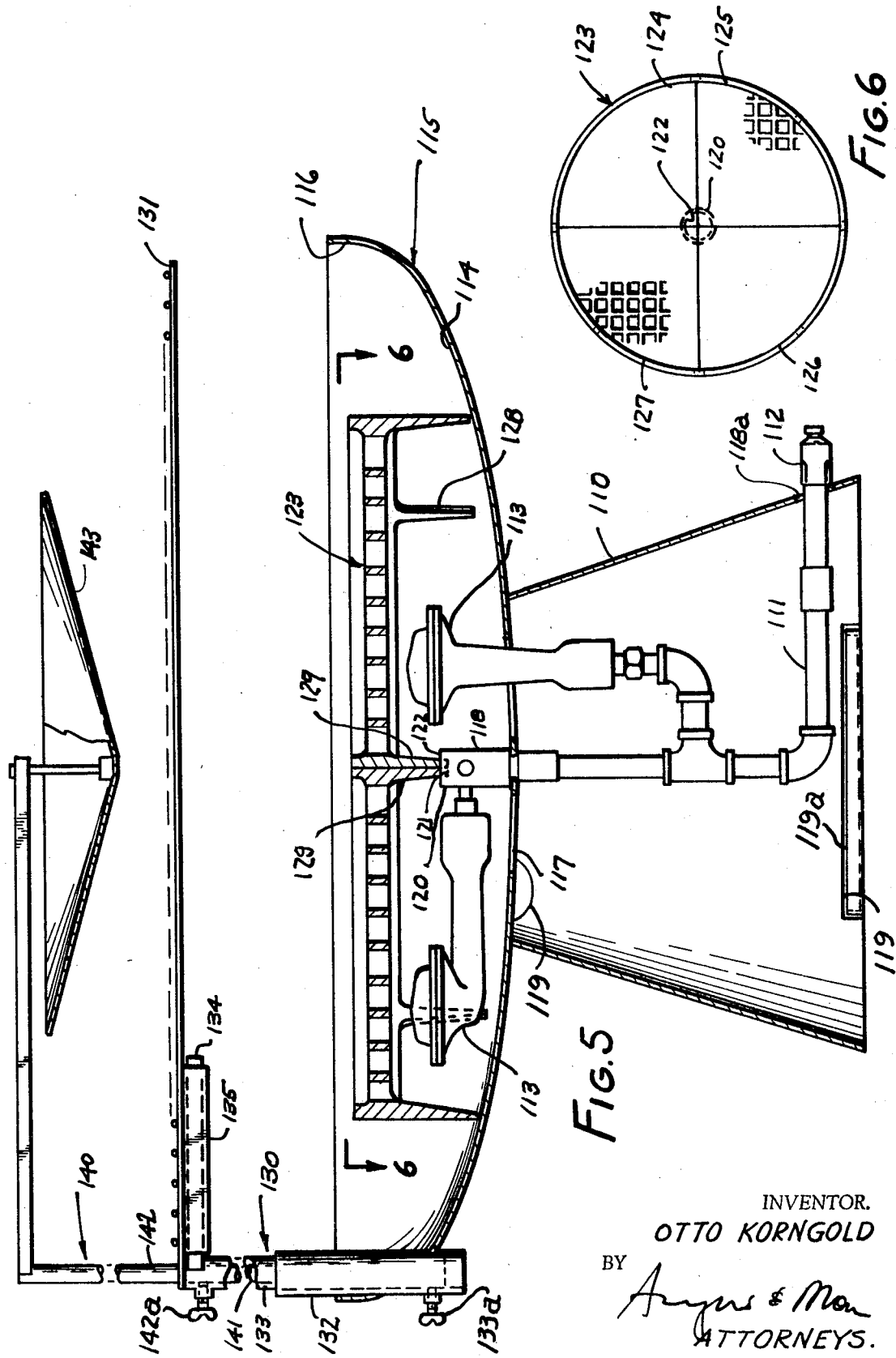

3,513,822
SPACE HEATERS
Otto Korngold, 61 E. Arthur, Arcadia, Calif. 90052
Filed Sept. 10, 1969, Ser. No. 856,669
Int. Cl. A47j 37/00; F24b 3/00
U.S. Cl. 126—4                                                   20 Claims

ABSTRACT OF THE DISCLOSURE

A heater according to this disclosure includes an open-topped basin. Supply means disposed within the basin is adapted to supply radiant heat from a source of combustible material such as charcoal, combustible gas, or rocks, pumice, or the like, heated by another source such as a gas burner. A reflector is supported above the basin to reflect heat to the surrounding area. The supply means may include a segmented perforated cast iron rack for supporting rocks or the like. A barbeque grill is provided in the vessel for cooking food and the like.

---

This invention relates to heaters and particulary to devices suitable for use selectively as a space heater or as a cooking stove, or for accomplishing both functions simultaneously.

During certain months of the year, and particularly during the summer months, people enjoy outdoor barbeques. During the late afternoon and early evening hours when the natural warmth of the sun has left the area, persons attending such barbeques often become chilly.

It is an object of the present invention to provide a heater arrangement whereby radient heat is reflected from a device which may be used as a stove, such as a barbeque or the like. The heat is reflected outwardly and downwardly thereby to heat the area surrounding the barbeque, utilizing the same fuel source as the cooking function does, or would if the cooking function were concurrently used.

According to the present invention an open-topped basin is provided. Supply means within the basin is adapted to supply heat from a source of combustible material such as charcoal or combustible gas, or other suitable materials. Reflector means is supported above the basin to reflect heat from the burning fuel to the area surrounding the device.

Optional and desirable features of the present invention are:

(a) the inclusion of an adjustable grill within the basin for supporting objects to be cooked, such as food;

(b) a grating or pan, preferably of a segmented perforated cast iron construction, to support an optional cooking fuel or medium such as lava rock or charcoal;

(c) a burner for supplying combustible gas to the basin and optionally connected to either a container of combustible gas or to an outlet which supplies combustible gas from a commercial source, and preferably below the grating or pan;

(d) a reflector supported above the grating to reflect heat from the vessel toward the surrounding area; and (e) a skirt around the reflector to deflect hot air downwardly.

According to another optional but desirable feature of the present invention, the reflector means comprises a plurality of tapered surfaces. Means supports the tapered surfaces in overlapping relationship to form a frusto-pyramidal surface, and means is provided to adjust the pitch of the frusto-pyramidal surface.

The above and other features of this invention will be fully understood from the following detailed description and the accompanying drawings, in which:

FIG. 1 is a side elevation partly in cutaway cross-section of one embodiment of a heater according to the invention;

FIG. 2 is a side view elevation partly in cutaway cross-section of a modification of a reflector illustrated in FIG. 1;

FIG. 3 is a side view elevation partly in cross-section of a modification of the invention illustrated in FIG. 1;

FIG. 4 is a plan view of an optional form of burner for use with the invention;

FIG. 5 is an axial cross-section of the presently preferred embodiment of the invention; and FIG. 6 is a fragmentary sectional view of FIG. 5, taken at line 6—6 therein.

In FIG. 1 there is illustrated a device 10 comprising a basin 12 mounted on a base 14. The base is hollow to enclose equipment yet to be described. An optional, removable smoker hood 16 is adapted to be stacked on top of basin 12 and is held in alignment on rim 18 by lip 20. An opening 22 is formed in the upper portion of hood 15 to permit the release of heat and smoke from under the hood.

A post 26 is mounted to the inside of basin 12 and has a threaded upper hole 27 to receive a threaded portion 31 of a rod 30. Flanges 32, 34 and 36 are attached to post 26. Flange 32 is the uppermost and is the smallest of the three flanges, while flange 36 is the lowermost and is the largest of the three flanges.

Flanges 32, 34 and 36 are preferably disc-shaped, and support a pan 38, a grating 40 and a burner 42, respectively. Pan 38 is so disposed and arranged as to support a combustible material such as charcoal within the basin 24. Grating 40 supports a cooking or heating medium such as lava rock. The pan and grating are usually used alternatively rather than simultaneously. The lava rock provides a source of radiation for reflecting heat to the surrounding area by the reflector. Burner 42 (in FIG. 1) in the form of a ring is connected by a suitable fitting 44 and line 50 through post 26 to a source 64 of fuel. The pan, or the grating plus burners, are often referred to herein as "supply means."

FIG. 4 shows a burner cluster 55 connectible to the same fuel line 50. The cluster of individual burners 55A has the advantage of using a larger number of standard, readily available burners. Bunsen type burners are preferred.

The central openings 52 and 54, respectively, in the grating and in the burner are proportioned so they will pass over the upper flanges and rest on their respective flanges. They are thereby rendered removable for independent and selectible use as well as for cleaning.

An internally threaded flange 56 is mounted to post 30 to support grill 58 Food to be cooked is placed on the grill, and the height of the grill may be adjusted by turning post 30 relative to post 26.

Within chamber 46 of base 14 there is provided a flexible gas pipe 60 having a fitting 62. Fitting 62 is connectible to container 64 and with fitting 66, which fitting in turn is connected to conduit 68. Container 64 contains compressed combustible gas and rests on the base. Conduit 68 is a source of commercial combustible gas such as the home gas supply. Flexible conduit 60 may be alternatively connected to either a portable source of combustible gas such as container 64, or to a commercial supply through conduit 68. Valve means 70 is provided in tube 50 to regulate the flow of gas to burner 42.

An inverted conical reflector 72 is slidably mounted to post 30 by means of collar 74. Reflector 72 may be constructed from any suitable reflective material such as polished steel or polished aluminum. It is preferred that the outside surface of the reflector have a polished or "mirror-like" finish, because these are most efficient in reflecting infrared radiation. Spider mechanism 76 is connected to collar 77. The collar fits over the post and gives lateral support to the reflector. Bolt 78 threads through collar 74 and serves to lock collar 74 on post 30 to give vertical adjustment and support to the reflector.

Preferably, but not necessarily, a downwardly and outwardly flared skirt 75 surrounds the conical portion. The conical portion reflects infrared radiation. The skirt laterally and downwardly deflects heated air.

With the device assembled as illustrated in FIG. 1, heat generated from the supply means, i.e., either the burner 42 with or without overlaying rocks or the like, or from charcoal within pan 38 may be used to cook food on grill 58. The hood is removed should smoke cooking not be desired. When lava is used, the pan may be removed and the burner is lit and heats the lava to a bright glow. Heat radiated from the lava bed will cook the food. Should charcoal be used, the lava bed may or may not be removed, but the pan will be used. When the charcoal is burning, it will cook food on the grill.

Whether or not cooking is being done, radiation reflected from the source of heat by the reflector will heat the surrounding area. Of course, the device may be used solely as a heater, by simply removing the grill. Furthermore, even the burner itself, without either the lava bed or the charcoal-filled pan will provide a source of space heating reflectible by the reflector.

FIG. 2 illustrates a modification of the reflector illustrated in FIG. 1. In FIG. 2 there is provided a plurality of reflective tapered elements 80 positioned in overlapping relationship and secured together by expandable ring 82 or other device which will define a perimeter at a selected spacing from a collar. Reflective elements 80 may be constructed from reflective material such as described for reflector 72 in FIG. 1. Collar 84 is mounted to the post and carries bolt 86. The reflective elements rest on collar 84, whose position on post 30 is adjustable. A collapsible spider arrangement 88 is provided comprising a plurality of telescopic elements 90 connected to fittings 92. The length of each spider element and element 90 may be adjusted by adjusting the length of each telescopic element, and locking in place with fitting 92. Thus, the pitch of the reflector defined by elements 80 may readily be adjusted, and the reflector may even by adjusted skew to the axis of fastener 30 by adjusting the spider so that one leg is shorter than its opposite leg. Skirt portions (not shown) may be held with this modification if desired.

Post 30 may be removed not desired, and also a shorter one may be provided, terminating at about point 65, should the reflector not be used and the other devices retained.

FIG. 3 illustrates a modification of the device of FIG. 1, corresponding parts bearing like reference numerals. The principal difference is in the reflector and its support.

An arm 96 is mounted to vessel 12 and is so disposed and arranged as to provide a support point 98 above the basin. The shape of arm 96 is arbitrary and is shaped to accord with aesthetic considerations. An upright socket 97 receives an end portion 99 of the arm, and the arm can be rotated so as to remove the reflector from above the basin, should its advantages not be desired. A set screw 99a is provided to adjust the height of the arm. Chain 100 is connected to point 98 and supports reflector 102 above the basin. Reflector 102 may be constructed from the same material suitable for reflector 72, and may have a skirt 103 if desired.

Chain 100 may be a link chain, rope, cable, rigid link or the like and the positioning of the reflector 102 may be determined by the length of chain 100 and the location of terminus 98. Alternatively, the reflector may be mounted directly to the arm. A suitable height adjustment means (not shown) may be provided on arm 96 if desired. Reflector 102 may be a simple, rigid conical reflector as illustrated in FIG. 3, or may comprise a plurality of adjustable overlapping triangular pieces such as illustrated in FIG. 2.

A removable lid 104 may be provided to close the basin.

The presently-preferred embodiment of the invention is shown in FIGS. 5 and 6. A tapered tubular support 110 rests on the ground and passes through its wall a fuel line 111 having a fitting 112 for attachment to a source of bottled gas or gas from a utility line. A plurality of burners 113 is connected to the fuel line. They stand above the bottom 114 of a circular basin 115. The basin has a rim 116 and a central air port 117 on central shaft 118. Port 118a passes through support 110. Additional air ports 119 may be notched into the tubular support. A drip pan 119a may be shoved through one of them beneath the center of the basin.

A central enclosure 120 has a bottom 121 and a wall 122. A rack 123 is made up of a plurality of arcuate perforated segments 124, 125, 126 and 127, the number, four, being found the most convenient. When made of cast iron, these racks resist warpage. The segments have first legs 128 which rest on the basin, and second legs 129 which are segmental in cross-section and cluster within enclosure 120. The rack is thereby geometrically and thermally stable.

The rack and burners are frequently herein referred to as a "supply means" as would be the rack alone if used to support charcoal. Preferably lava or pumice rock is laid atop the rack to be heated by the burners.

First support means 130 is provided for supporting a grill 131 above the rack. The grill is used for supporting food to be cooked. The first support means comprises a socket 132 mounted to the rim of the basin into which a rotatable shaft 133 is fitted. A wing screw 133a is threaded into the socket and adjusts the height of a square, horizontal extension 134 on the shaft. A square socket 135 on the grill is engageable to the extrusion. The grill is then stable, and can be swung both over and away from the top of the basin. It is also readily removed from the horizontal extension.

Second support means 140 comprises an upwardly-oriented circular socket 141 in shaft 133 into which arm 142 may be fitted, and in which the arm may be turned so as to move reflector 143 over and away from the top of the basin. A wing screw 142a is threaded into shaft 133 so as to adjust the height of the reflector.

The present invention thus provides a device which is suitable for selective use as a space heater or a cooking stove or both functions simultaneously. When used for both functions simulaneously, the heat source used for cooking is also used for space heating. The device may be connected to a commercial combustible gas container, or charcoal. The device is simple in construction and manufacture, easily adjustable and highly efficient.

I claim:

1. A combined cooker and heater comprising; an open-topped basin; supply means in said basin adapted to supply said basin with a source of heat; first support means in said basin and above said supply means for supporting a cooking grill upon which material to be cooked may be placed; second support means mounted to said basin; and reflector means mounted to said second support means above said basin, said reflector means having an outer surface for reflecting heat from said basin to a laterally adjacent region surrounding said basin.

2. A heater according to claim 1 wherein said second support means comprises a first post mounted to said basin and a second post mounted to said reflector means, said first and second posts being engageable along a common axis.

3. A heater according to claim 1 wherein said second support means comprises an arm mounted to the side of said basin, said arm having a support point above said basin, and attachment means attaching said reflector means to the support point.

4. A heater according to claim 3 wherein said attachment means comprises a flexible member whose length is adjustable.

5. A heater according to claim 3 in which the arm is rotatably mounted to the basin, whereby said reflector may be moved over, or away from over, the basin.

6. A heater according to claim 1 wherein said reflector means comprises a plurality of tapered surfaces, means supporting said tapered surfaces in overlapping relationship to form a substantially frusto-pyramidal surface having a pitch, and means for adjusting the pitch of the frusto-pyramidal surface.

7. A heater according to claim 1 wherein said reflector means comprises a conical surface having a generator oblique to said axis, said reflector means being arranged and disposed relative to the basin so that the generator of the surface recedes from said axis as it recedes from said basin.

8. A heater according to claim 1 further including adjustment means connected to said reflector means for adjusting the position of said reflector means relative to said basin.

9. A heater according to claim 1 wherein said supply means comprises a pan adapted to contain a combustible material and third support means mounted to said basin for supporting said pan in said basin below said grill.

10. A heater according to claim 1 wherein said supply means comprises gas-discharge means adapted to discharge combustible gas, and third support means mounted to said basin for supporting said gas-discharge means in said basin below said grill.

11. A heater according to claim 10 wherein said supply means further comprises a grate adapted to retain heat-retaining material, fourth support means mounted to said basin for supporting said grate in said basin between said gas-discharge means and said grill.

12. A heater according to claim 11 in which said reflector means includes a peripheral downwardly and outwardly flaring skirt.

13. A heater according to claim 1 in which said reflector means includes a peripheral downwardly and outwardly flaring skirt.

14. A heater according to claim 1 in which said supply mean comprises a gas burner, and a rack overlaying the same for supporting a heatable medium.

15. A heater according to claim 14 in which said rack is a perforated segmented cast iron structure.

16. A heater according to claim 14 in which said rack is circular and constructed of a plurality of perforated arcuate segments, each segment having a leg making contact with the basin, and another leg fitted into a central enclosure.

17. A heater comprising: an open-topped basin; supply means in said basin adapted to supply said basin with a source of heat; reflector means comprising a plurality of tapered surfaces, means supporting said tapered surfaces in overlapping relationship to form a substantially frusto-pyramidal surface having a pitch, means for adjusting the pitch of the frusto-pyramidal surface; support means mounted to said basin, said reflector means being supported by said support means above said basin, said frusto-pyramidal surface having an outer surface for reflecting heat from said basin to a laterally adjacent region surrounding said basin.

18. A heater according to claim 17 further including second support means in said basin above said supply means, and a grill adapted to be supported by said second support means for supporting material to be cooked.

19. A heater according to claim 18 wherein said supply means comprises a pan adapted to contain a combustible material, and third support means mounted to said basin for supporting said pan in said basin below said grill.

20. A heater according to claim 17 further including adjustment means mounted to said support means for adjusting the position of said reflector means relative to said basin.

References Cited
UNITED STATES PATENTS

| | | | |
|---|---|---|---|
| 558,777 | 4/1896 | Cinnamon | 126—120 |
| 2,513,580 | 7/1950 | Milligan | 126—25 |
| 2,867,165 | 1/1959 | Money | 99—423 |
| 2,998,814 | 9/1961 | Forsberg. | |
| 3,021,830 | 2/1962 | Witcher. | |
| 3,064,534 | 11/1962 | Tumavicus | 126—270 X |
| 3,244,163 | 4/1966 | McGlaughlin | 126—25 |
| 3,276,440 | 10/1966 | Sazegar. | |

CHARLES J. MYHRE, Primary Examiner

U.S. Cl. X.R.

126—25, 41